(12) United States Patent
Bolcer et al.

(10) Patent No.: US 12,265,547 B2
(45) Date of Patent: *Apr. 1, 2025

(54) ENTERPRISE DATA PROCESSING (71) Applicant: Bitvore Corp., Los Angeles, CA (US)

(72) Inventors: Greg Bolcer, Los Angeles, CA (US);
Alan Chaney, Los Angeles, CA (US);
Clay Cover, Los Angeles, CA (US)

(73) Assignee: Bitvore Corp., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,701

(22) Filed: Aug. 16, 2022

(65) Prior Publication Data

US 2023/0041672 A1 Feb. 9, 2023

Related U.S. Application Data

(63) Continuation of application No. 16/541,386, filed on Aug. 15, 2019, now Pat. No. 11,449,562, which is a continuation of application No. 15/370,717, filed on Dec. 6, 2016, now Pat. No. 10,430,480, which is a
(Continued)

(51) Int. Cl.
*G06F 16/00* (2019.01)
*G06F 16/23* (2019.01)
*G06F 16/2457* (2019.01)
*G06F 16/25* (2019.01)
*G06F 16/27* (2019.01)
(Continued)

(52) U.S. Cl.
CPC .............. *G06F 16/27* (2019.01); *G06F 16/23* (2019.01); *G06F 16/24578* (2019.01); *G06F 16/256* (2019.01); *G06F 16/31* (2019.01); *G06F 16/9535* (2019.01)

(58) Field of Classification Search
None
See application file for complete search history.

(56) References Cited

U.S. PATENT DOCUMENTS 6,606,744 B1 * 8/2003 Mikurak ................... H04L 9/40
717/174
6,629,081 B1 * 9/2003 Cornelius .............. G06Q 20/04
705/30

(Continued)

FOREIGN PATENT DOCUMENTS

JP 2012256324 A * 12/2012 ............. G06F 16/25

OTHER PUBLICATIONS

Proffitt, What Hadoop can, and can't do, Jun. 2012, ITworld.
(Continued)

*Primary Examiner* — Jean M Corrielus
(74) *Attorney, Agent, or Firm* — McAndrews, Held & Malloy, Ltd.

(57) ABSTRACT

An enterprise data processing module and method are described herein. The enterprise data processing module comprises at least one collector and at least one analyzer. The collectors may be operable to collect data pieces from a plurality of data sources. The analyzers may be operable to analyze the collected data pieces to determine cross-source relationships that exist between the data pieces collected from the plurality of sources. The analyzed data pieces may be stored in one or more big-data databases as blocks of data according to the cross-source relationships.

32 Claims, 5 Drawing Sheets

Related U.S. Application Data continuation of application No. 13/971,115, filed on Aug. 20, 2013, now Pat. No. 9,547,682.

(60) Provisional application No. 61/691,911, filed on Aug. 22, 2012.

(51) Int. Cl.
*G06F 16/31* (2019.01)
*G06F 16/9535* (2019.01)

(56) References Cited

U.S. PATENT DOCUMENTS

| | | | | |
|---|---|---|---|---|
| 6,671,818 | B1* | 12/2003 | Mikurak | H04L 63/08 |
| | | | | 714/48 |
| 6,904,449 | B1* | 6/2005 | Quinones | H04L 67/53 |
| | | | | 709/219 |
| 7,069,234 | B1* | 6/2006 | Cornelius | G06Q 40/00 |
| | | | | 705/26.8 |
| 7,953,814 | B1 | 5/2011 | Chasin et al. | |
| 7,966,369 | B1* | 6/2011 | Briere | H04L 67/1097 |
| | | | | 709/204 |
| 8,341,101 | B1 | 12/2012 | Treiser | |
| 8,554,794 | B2 | 10/2013 | Brydon et al. | |
| 8,930,380 | B1 | 1/2015 | Saurabh et al. | |
| 9,081,777 | B1 | 7/2015 | Krawczyk | |
| 9,547,682 | B2 | 1/2017 | Chaney et al. | |
| 10,430,480 | B2 | 10/2019 | Bolcer et al. | |
| 2002/0194219 | A1* | 12/2002 | Bradley | G06F 40/117 |
| | | | | 725/9 |
| 2004/0064351 | A1* | 4/2004 | Mikurak | G06Q 30/0269 |
| | | | | 705/22 |
| 2005/0010565 | A1 | 1/2005 | Cushing et al. | |
| 2005/0065980 | A1* | 3/2005 | Hyatt | G06F 16/951 |
| 2005/0182745 | A1* | 8/2005 | Dhillon | G06Q 10/10 |
| 2006/0178918 | A1* | 8/2006 | Mikurak | G06Q 10/06 |
| | | | | 705/7.31 |
| 2007/0185863 | A1 | 8/2007 | Budzik et al. | |
| 2007/0294281 | A1 | 12/2007 | Ward et al. | |
| 2008/0215607 | A1* | 9/2008 | Kaushansky | G06Q 30/02 |
| | | | | 707/999.102 |
| 2008/0249981 | A1 | 10/2008 | Norring et al. | |
| 2008/0270458 | A1* | 10/2008 | Gvelesiani | G06F 16/288 |
| 2008/0301094 | A1* | 12/2008 | Zhu | G06F 16/34 |
| 2008/0301095 | A1* | 12/2008 | Zhu | G06F 16/951 |
| 2008/0301120 | A1* | 12/2008 | Zhu | G06F 16/31 |
| | | | | 707/999.005 |
| 2009/0222329 | A1* | 9/2009 | Ramer | G06Q 30/0261 |
| | | | | 707/999.009 |
| 2009/0234711 | A1* | 9/2009 | Ramer | G06Q 30/0269 |
| | | | | 705/14.66 |
| 2009/0234861 | A1* | 9/2009 | Ramer | G06F 16/68 |
| 2009/0240568 | A1* | 9/2009 | Ramer | G06F 16/68 |
| | | | | 705/35 |
| 2009/0240569 | A1* | 9/2009 | Ramer | G06F 16/9577 |
| | | | | 707/999.01 |
| 2009/0240586 | A1* | 9/2009 | Ramer | G06F 16/9577 |
| | | | | 705/14.64 |
| 2009/0265375 | A1* | 10/2009 | Zhuge | G06F 16/284 |
| | | | | 707/999.102 |
| 2009/0319518 | A1 | 12/2009 | Koudas et al. | |
| 2010/0057772 | A1* | 3/2010 | Manolescu | G06Q 30/02 |
| | | | | 707/E17.055 |
| 2010/0063877 | A1* | 3/2010 | Soroca | G06Q 30/0247 |
| | | | | 705/14.46 |
| 2010/0094878 | A1* | 4/2010 | Soroca | G06Q 30/0267 |
| | | | | 707/812 |
| 2010/0161662 | A1 | 6/2010 | Jonas et al. | |
| 2011/0119613 | A1* | 5/2011 | Zhu | G06F 16/382 |
| | | | | 715/771 |
| 2011/0258049 | A1* | 10/2011 | Ramer | G06Q 30/0273 |
| | | | | 705/14.69 |
| 2011/0282860 | A1* | 11/2011 | Baarman | G06F 16/9535 |
| | | | | 707/E17.108 |
| 2012/0150888 | A1* | 6/2012 | Hyatt | G06F 16/9535 |
| | | | | 707/758 |
| 2012/0209707 | A1* | 8/2012 | Ramer | G06Q 30/0269 |
| | | | | 705/14.51 |
| 2012/0209708 | A1* | 8/2012 | Ramer | G06F 16/9535 |
| | | | | 705/14.51 |
| 2012/0209709 | A1* | 8/2012 | Ramer | G06Q 30/0273 |
| | | | | 705/14.51 |
| 2012/0209710 | A1* | 8/2012 | Ramer | G06Q 30/0273 |
| | | | | 705/14.51 |
| 2012/0239763 | A1 | 9/2012 | Musil | |
| 2012/0317155 | A1* | 12/2012 | Ogasawara | G06F 16/25 |
| | | | | 707/812 |
| 2013/0103667 | A1 | 4/2013 | Ming | |
| 2013/0204822 | A1 | 8/2013 | Treiser | |
| 2013/0231975 | A1 | 9/2013 | High et al. | |
| 2014/0280187 | A1* | 9/2014 | Molaro | G06F 16/278 |
| | | | | 707/741 |
| 2014/0324920 | A1* | 10/2014 | Hamilton | G06F 3/0685 |
| | | | | 707/812 |
| 2015/0186437 | A1* | 7/2015 | Molaro | G06F 16/278 |
| | | | | 707/741 |

OTHER PUBLICATIONS

Int'l Search Report and Written Opinion AppIn No. PCT/US2013/055756 dated Oct. 24, 2013.
Int'l Preliminary Report on Patentability AppIn No. PCT/US2013/055756 mailed Mar. 5, 2015.

* cited by examiner

Fig. 2

ENTERPRISE DATA PROCESSING

CROSS-REFERENCE TO RELATED APPLICATIONS/INCORPORATION BY REFERENCE

This application is a continuation of U.S. patent application Ser. No. 16/541,386, filed Aug. 15, 2019, now U.S. Pat. No. 11,449,562, which is a continuation of U.S. patent application Ser. No. 15/370,717, filed Dec. 6, 2016, now U.S. Pat. No. 10,430,480, which is a continuation of U.S. patent application Ser. No. 13/971,115, filed Aug. 20, 2013, now U.S. Pat. No. 9,547,682, which claims priority to U.S. provisional patent application Ser. No. 61/691,911, filed Aug. 22, 2012. The above-referenced United States patent applications are hereby incorporated herein by reference in their entirety.

FIELD

The invention relates to the field of large scale data processing. In particular, but not exclusively, it relates to automated analysis of data that may be stored in a decentralized manner.

BACKGROUND

With the growth of the use of the Internet, the growth of data usage in private networks and the growth of data used by companies and other entities, both internal and external data, the need for massive data storage and massive computing power has risen. Therefore, many entities are turning to cloud computing. The terms "the cloud" or "cloud computing" may refer generally to large scale data centers that are maintained by a third party, or a company or entity, for example one that maintains systems and/or software that work with the data center(s), where the storage and computing capabilities of the numerous servers within the data center are offered to internal or external customers through one or more network connections. Because relatively small entities may have access to the large scale storage and computing power of many servers, the entities can have access to large-scale computing power that is flexible and available while lowering or eliminating the costs needed to maintain the data centers. Various databases, such as communications databases and/or databases in a cloud computing data center, may be useful for storing massive amounts of data, but in various database approaches, the data is stored in a decentralized manner, across several servers or nodes, and information regarding the relationships or correlations between the data may not be stored. In various databases, for example, communications databases and/or other forms of databases, large-scale data is formatted or structured to be most easily used for task-specific computations. In other words, data may be analyzed at the outset, for example a particular relationship may be analyzed, and then the data and the resulting conclusion are stored in a specific format. For various databases, this is called a schema. Once the initial analysis is done, it may be very time consuming and difficult to re-structure and/or re-analyze data to find a new value, short of retrieving, harvesting and/or archiving locally all the data the user is interested and then organizing and/or performing computations or routines on the data to analyze relationships.

Data has become a key asset for most modern day enterprises. Managing this data has become a major problem for the IT departments of these companies and organizations. For many years, the changes in business requirements have made it more and more difficult and expensive for enterprises to keep abreast of the changes in data—firstly, because of continuous changes in the tools and standards, and secondly because of the exponential increase in the amount of data that is being made available.

Enterprises may find it difficult to detect business value in the relationships between data points, where many different types of data exist. Trying to convert data to a heterogeneous but flexible format may likely result in incomplete information that is collected from limited points.

Further limitations and disadvantages of conventional and traditional approaches will become apparent to one of skill in the art, through comparison of such systems with the present invention as set forth in the remainder of the present application with reference to the drawings.

BRIEF SUMMARY

Aspects of the present invention are aimed at reducing or eliminating the above problems with the prior art. In particular, but not exclusively, aspects of the invention are directed to large scale data processing modules and methods for automated analysis of data that may be stored in a decentralized manner.

One example embodiment of this invention comprises an enterprise data processing module. The enterprise data processing module comprises at least one collector and at least one analyzer. The collectors may be operable to collect data pieces from a plurality of data sources. The analyzers may be operable to analyze the collected data pieces to determine cross-source relationships that exist between the data pieces collected from the plurality of sources. The analyzed data pieces may be stored in one or more big-data databases as blocks of data according to the cross-source relationships.

In another example embodiment of this invention, the enterprise data processing module, comprises a user interface operable to receive a request from a user to interact with a data group stored in the one or more big-data databases. The request may be attempting to utilize information from the cross-source relationship. The information from the cross-source relationship may comprise conclusion data that supports a schema. If the user has permission to access information from the cross-source relationship, the request may be processed to return the conclusion data without extracting all underlying data required to compute the requested conclusion data.

In another example embodiment of this invention, the cross-source relationship may comprise a degree of correlation that is determined by a correlation intensity algorithm. The correlation intensity algorithm may determine a level of similarity with respect to factors such as, but not limited to: the number of unique concepts in each data piece; a complexity of the data pieces; a size of the data pieces; a spam score of each data piece; and/or a readability score of each data piece.

BRIEF DESCRIPTION OF SEVERAL VIEWS OF THE DRAWINGS

The invention will now be described in greater detail with reference to accompanying figures, in which.

DETAILED DESCRIPTION

Entities or enterprises, for example large companies, may either store or be in control of massive amounts of internal and external data, for example, communications data (e.g., email, social media, bulletin board forums, etc.) and/or other form(s) of data. Some of this information may be stored on one or more internal enterprise servers. Some of this information may be stored on one or more external servers, for example, in one or more servers used to run a social networking or bulletin board forum service. In various enterprise data management systems, this massive amount of internal and external data may be valuable to the enterprise; however, the data may be difficult to manage and/or analyze, for example, because the data is unstructured and/or continuously growing and changing. In various enterprise data management systems, this massive amount of internal and external data, for example, communications data, is not captured or analyzed across the whole data spectrum of different data types and formats.

The present disclosure describes one or more systems, methods, routines, techniques and/or tools for enterprise data processing (EDP). The EDP may be designed and/or adapted to capture and analyze data, for example, communications data from various sources (e.g., email, social networks, bulletin boards, forums, content management systems, phone logs, other corporate databases, etc . . . ) and/or other form(s) of data such that this massive amount of data may be used in a valuable way by an enterprise. The EDP may be designed and/or adapted to compare, analyze, annotate and/or correlate this data across the whole data set (i.e., data from all of the various sources). The EDP may be designed and/or adapted to store data, for example, communications data, from various sources, as well as information about various correlations or relationships between the data, under a single "umbrella," in a manner such that the data is readily accessible and modifiable. The EDP may be designed and/or adapted to integrate various types of internal and external enterprise data and/or systems into a single flexible data store.

The EDP may utilize cloud computing and/or other systems, that offer massive data storage and/or massive computing power. The terms "the cloud" or "cloud computing" may refer generally to large scale data centers that are maintained by a third party, or a company or entity, for example one that maintains systems and/or software that work with the data center(s), where the storage and computing capabilities of the numerous servers within the data center are offered to internal or external customers through one or more network connections. The EDP may utilize massive storage capabilities of cloud computing to store data, for example, communications data and/or other form(s) of data, from various sources (e.g., email, social networks, bulletin boards, forums, content management systems, phone logs, other corporate databases, etc.). Various databases, for example, communications databases, other form (s) of databases, and/or databases in a cloud computing data center, may be useful for storing massive amounts of data, but in various database approaches, the data is stored in a decentralized manner, across several servers or nodes, and information regarding the relationships or correlations between the data may not be stored.

The EDP may be designed and adapted to provide all the benefits of cloud computing while preserving valuable correlation information and/or other information or metadata. The EDP may be designed and adapted to determine and/or analyze relationships or correlations between data and may save this correlation information or other information when the data is stored to a database, for example, a communications database and/or other form(s) of database. In various databases, for example, communications databases and/or other form(s) of databases, large-scale data is formatted or structured to be most easily used for task-specific computations. In other words, data may be analyzed at the outset, for example a particular relationship may be analyzed, and then the data and the resulting conclusion are stored in a specific format. For various databases, this is called a schema. Once the initial analysis is done, it may be very time consuming and difficult to re-structure and/or re-analyze data to find a new value, short of retrieving, harvesting and/or archiving locally all the data the user is interested and then organizing and/or performing computations or routines on the data to analyze relationships. The EDP may be designed and adapted to restructure data in various ways that are useful to an entity, for example an enterprise, and various relationships between the data that are useful to the entity may be determined, for example according to strengths, weaknesses, opportunities, and threats of and to the entity within and across the data. Saving the correlation information may also be referred to as mapping the correlation information to the database, for example, a communications database and/or other database for other form(s) of data. Correlation information may refer generally to information that indicates how one or more pieces of data relate to each other. One example of correlation information, using an example of data within a communications database, may be the relationship between individual messages within an email thread or a social media thread.

The EDP may be designed and adapted to allow users to quickly explore, analyze, manipulate and interact with stored data and correlation information, for example, in real time and receiving quick responses. One benefit of the EDP may be that, because relationships between data are stored in addition to the data, and because new relationships can be discovered or generated at a later time, users may explore relationships between data on the fly, for example, relationships that the user may not have intended to explore when they saved the data. The EDP may create an Agile-style data model that allows dynamic analysis of data, where the data and relationships may be kept live and readily accessible by users. The EDP may offer benefits over other various database approaches that may require a user to retrieve, harvest and/or archive all the data the user is interested in from the database, for example, a communications database and/or other database for other form(s) of data, and then organize and/or perform computations and/or routines on the data to analyze relationships. The EDP may be designed and adapted to allow users to re-use relationship and other information about the data in various ways without having to re-create data relationship sets. The EDP may be designed and adapted to provide data management and analysis capabilities similar to those offered by various relational databases, while offering the power and flexibility of non-relational databases and other forms of databases often found in cloud computing. The EDP may be designed and adapted to allow applications that are built around relational databases to continue running like normal (i.e. as the application may normally run on a relational database) while still taking advantage of cloud computing. The EDP may be designed and adapted to integrate with various sorts of internal and external enterprise data and systems, and those data and systems of other entities.

Figure 1:
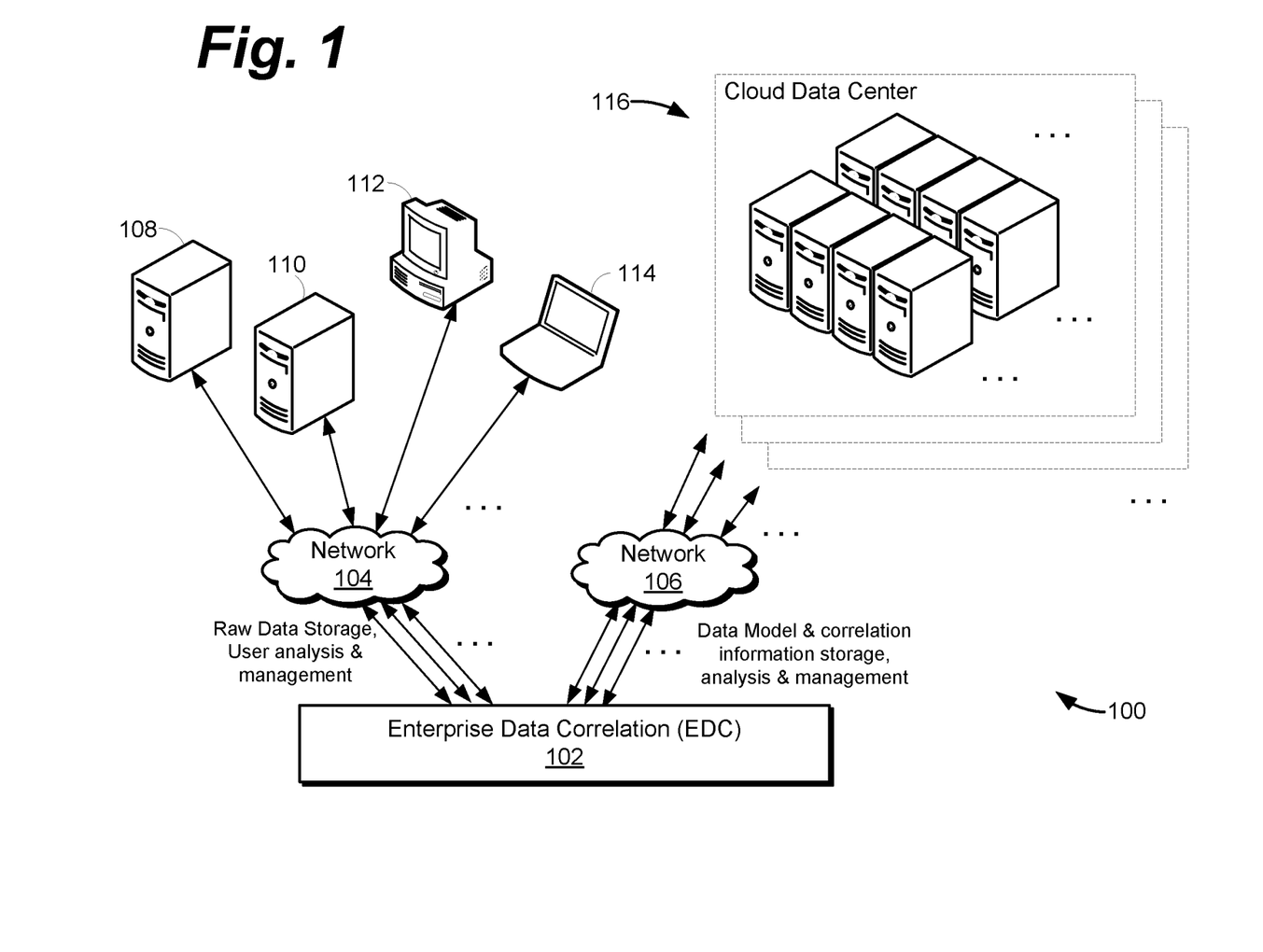
FIG. 1 is an example illustration of a network that comprises an example embodiment of the present invention.

FIG. 1 depicts an illustration of a block diagram showing example components, connections and interactions of a network setup 100 where one or more embodiments of the present disclosure may be useful in such a network setup. It should be understood that the network setup 100 may include additional or fewer components, connections and interactions than are shown in FIG. 1. FIG. 1 focuses on a portion of what is typically a much larger network of components, connections and interactions. Network setup 100 may include an enterprise data processing module (EDP) 102, according to one or more embodiments of the present disclosure. Network setup 100 may include one or more networks 104, 106, one or more source devices (for example, source devices 108, 110, 112, 114) and one or more cloud data centers 116. It should be understood that although various descriptions and/or drawings herein may refer to cloud data centers as one example of a database, one or more systems, methods, routines, techniques and/or tools described herein may apply to other databases, for example, communications databases and/or other forms of data bases, that store data in a distributed manner.

Source devices 108, 110, 112, 114 may be examples of various devices within an entity or enterprise that create and manage large amounts of various forms of data, for example, both structured and unstructured data (e.g., unstructured data such as email, social media, documents, web content, and structured data such as server logs, phone logs, customer service logs, etc.). In some embodiments, source devices may be examples of various internal and/or external sources that an entity or enterprise is interested in, for example, various email and messaging databases and/or various social networking and/or bulletin board forum services. Source devices may be in communication with each other and/or an EDP 102 via a network 104. The EDP 102 may be in communication with one or more cloud data centers 116 via a network 106. Network 106 may be the same general collection of network connections as network 104, or it may be separate. It should be understood that although FIG. 1 shows the EDP) 102 as being separated from the source devices and cloud data centers via networks, other configurations are contemplated. For example, the EDP 102 may be integrated with one or more cloud data centers, and/or the EDP 102 may be part of a local network with one or more source devices. In some embodiments, the EDP may be configured in a distributed fashion to perform data correlation with respect to one or more source devices.

In operation, source devices (source devices 108, 110, 112, 114) create and/or store large amounts of data. Various source devices may initiate storage of data to one or more cloud data centers 116 or connections databases. Additionally, various source devices, for example social networking services, may store data that is accessed by a separate device that initiates storage of the data to one or more cloud data centers 116 or connections databases. The EDP 102 may collect and analyze the data from the source devices, for example, before the data is stored to the cloud data centers 116 or connections databases. The EDP may be designed and adapted to determine and/or analyze relationships or correlations between data and may save this correlation information when the data is stored to a database, for example, a communications database and/or other form(s) of database(s).

Figure 2:
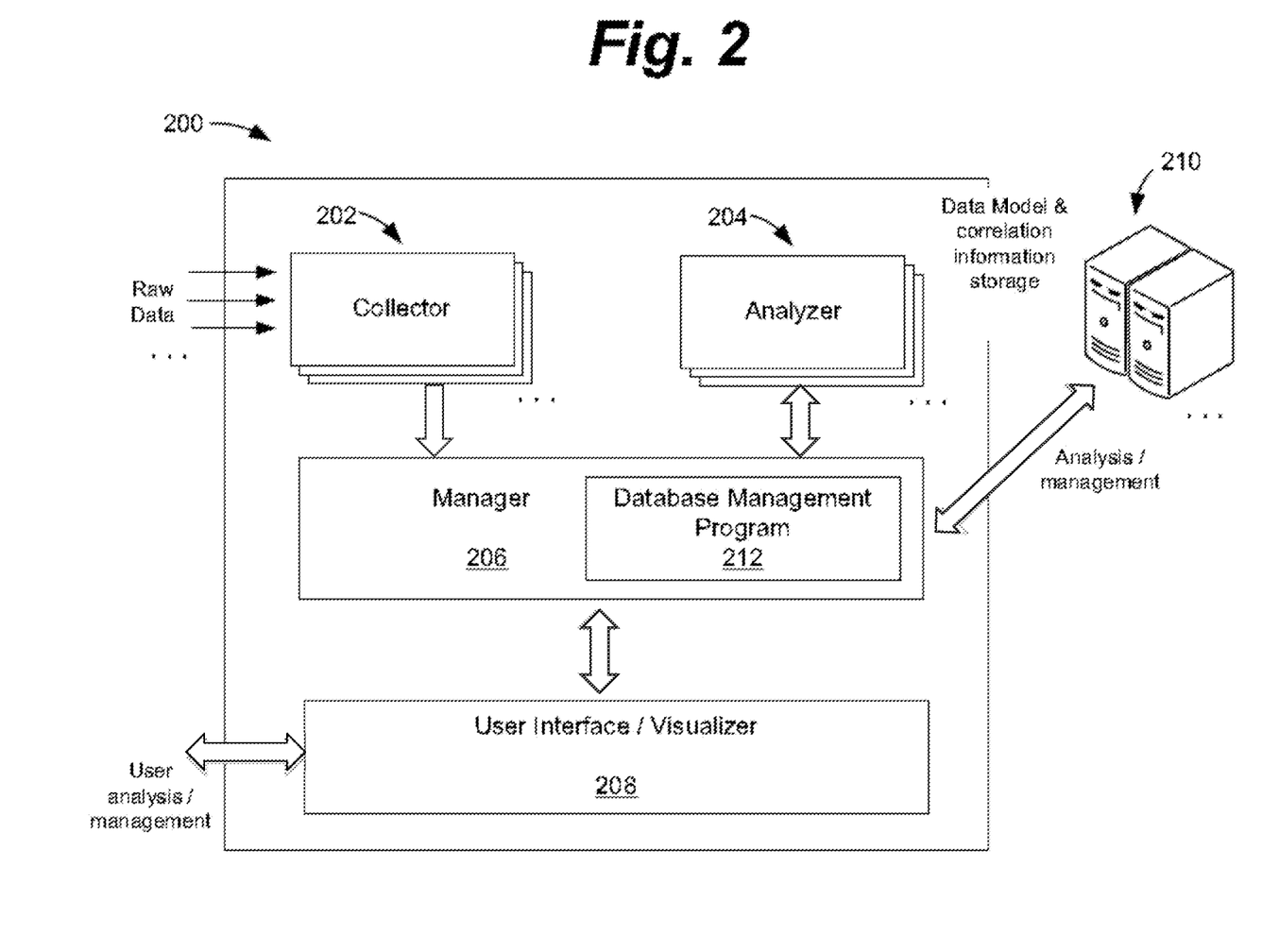
FIG. 2 is a block diagram of a data relationships storage platform (DRSP) according to one or more example embodiments of the present invention.

FIG. 2 depicts an illustration of a block diagram showing example components, connections and interactions of an enterprise data processing module (EDP) 200, according to one or more example embodiments of the present disclosure. The EDP 200 may include one or more collectors 202, one or more analyzers 204, a manager 206 and a user interface and visualizer 208. In some embodiments, the one or more collectors 202, one or more analyzers 204, the manager 206 and/or the user interface and visualizer 208 may be referred to as "data primitives," for example because they act on or perform operations with respect to data, raw data and/or particular types of data. In some embodiments, the enterprise data processing module (EDP) 200 may be designed and/or adapted to add, modify or remove data primitives as needed, for example, to handle new source devices. The EDP 200 may be in communication with one or more databases 210, for example, communications databases and/or other form(s) of databases. The database(s) 210, for example, communications databases and/or other form(s) of database(s), may be similar to the cloud data center(s) 116 of FIG. 1. In some embodiments of the present disclosure, the database(s) 210 or cloud data centers may be included within the EDP 200.

The collector(s) 202 accept data from multiple sources, for example, source devices similar to source devices 108, 110, 112, 114 shown in FIG. 1. Collector(s) 202 may implement a number of "crawlers," for example social network crawlers. A crawler may refer to a computer program or routine that browses a network, for example, the internet, in a methodical, automated manner or in an orderly fashion. Crawlers may maintain a list of network locations to visit and browse or scan for relevant data. For example, one crawler or portion of a crawler may be programmed or designed to scan a particular social networking service for data that is relevant to an enterprise. The data may be relevant because it was sent to (or "posted") to a profile associated with the enterprise, or it may be data that mentions the enterprise but is sent to or posted to other profiles. Collector(s) 202 may organize raw data from multiple sources and present data to one or more analyzers 204 in a useful format.

The analyzer(s) 204 may accept data from the collector(s) 202, and may analyze the data and/or compare the data to other data to determine relationships between data and/or within data. The analyzer(s) 204 may execute and/or use one or more correlation intensity algorithms to analyze the data. A correlation intensity algorithm may determine the degree of correlation between pieces of data. For example, data may be strongly correlated, loosely correlated or not correlated. A correlation intensity algorithm may determine the degree of correlation between pieces of data with or without referencing the content of the data.

The analyzer(s) 204 may use one or more algorithms to assemble subsets or new groupings of the data in various ways and/or to associate data according to different relationships or correlations. The analyzer(s) 204 may be designed, adapted and/or tuned to slice and/or correlate data in ways that are important to an entity, for example, to deal with strengths, weaknesses, opportunities, and threats across the enterprise. In various embodiments of the present disclosure, the analyzer(s) 204 may analyze data for relationships including, but not limited to, the following: time, content, keywords, associated users or profiles, and sentiment. Non-textual data may be similarly stored and analyzed with the system. In some embodiments, the analyzer(s) 204 may analyze data to determine, for example, which employees in an enterprise are talking to which customers, and, optionally, what subjects they are discussing. In some embodiments, the analyzer(s) 204 may analyze data to look for and correlate different types of business data, for example server logs and sales data could be correlated with engineer and/or marketing data. As another example, public data (i.e., data from external sources such as social networking services) may be correlated with private data (i.e., a company's server logs and internal email messages). As another example, data from a particular type of source (e.g., company email) may be correlated (same-source correlation). As another example, data from multiple sources (e.g., company email, social networking services, news feeds, and server logs) may be correlated (cross-source correlation).

A correlation intensity algorithm may utilize one or more characteristics and/or metrics to determine the intensity of correlation between data. The algorithm may assign weights, for example based on user input, to characteristics and/or metrics, where the weights may indicate how important a particular characteristic and/or metrics is to the correlation determination. Characteristics or metrics may allow a correlation intensity algorithm to flexibly evaluate correlations across many different dimensions of the data. Characteristics or metrics may be normalized, for example, to a range between 0 and 1 inclusively or between −1 and 1. Normalization may allow characteristics or metrics to be combined with user-provided weightings, for example, to generate a single composite weight on the fly. The following may be example characteristics or metrics used by correlation intensity algorithms: data length (e.g., all messages in a thread or a parallel metric in the case of structured data such as server logs), number of data pieces in a data chunk (e.g., number of messages in a thread or similar metric in the case of structured data such as server logs), number of users associated with a data chunk (e.g., number of participants in a message thread), average data chunk length (e.g., average message length of message in a thread), entropy score (a measure of how complex or unique the contents of the data chunk are) (e.g., the combined entropy score of all messages in thread), spam score (e.g., a spam score for each message in a thread), readability score that indicates the approximate grade level of the text in the data chunk, readability score indicating the number of years of education needed for comprehension of the text in the data chunk, the number of unique concepts (e.g., the number of unique concepts in a thread, for example, as determined by a search and/or analysis engine), average sentiment score (e.g., the average sentiment score of messages, for example, as calculated by a search and/or analysis engine) and/or concept density (e.g., unique concepts divided by length of a thread).

The analyzer(s) 204 may build up one or more data models from the data from one or more source devices, for example, using information from one or more correlation intensity algorithms and, optionally, one or more other tools, such as filters. The analyzer(s) 204 may include other information in a data model, for example, access controls and/or other rules associated with the data. The analyzer(s) 204 may communicate one or more data models and/or other data or information to one or more datastores 210, for example one or more cloud data centers.

A data model may include one or more "data globs." A data glob may refer to a cluster or block of data and various other related pieces of information or attributes related to the data. A data glob may contain data in various forms, for example, structured data, unstructured data, both structured and unstructured data, communications data or other form of data. A data glob may include multiple pieces of data content, related users, relevant access rules and the like. As one example, a data glob may include a block of messages, including the content of the messages, related profiles, times, access rules and the like. Each data glob may store information about the data glob, information similar to metadata, for example a name, a description, a unique identifier and the like. Data globs may reside in a database, for example, a communications database, or some other form of database, and/or a cloud data center, either in a relatively centralized manner or data globs may be stored in a distributed fashion, for example, with different parts of the data glob being stored on different servers. Data globs may be designed, adapted or programmed such that they can be easily interacted with. For example, data globs, as a single unit, may be capable of being moved, copied, filtered, searched, processed, synchronized, split, merged, modified, analyzed and the like.

Data globs may be reusable, in a manner similar to the way objects are reused in object-oriented programming. For example, multiple data globs may be assembled into a larger piece of data, which may constitute a new data glob. One efficient approach to using data globs may be to reuse as much of an existing data glob as possible, changing only details that differ from the data glob being used. For example, when a new data glob is created using an existing data glob, much of the existing data glob may be useable, and extra and/or different data may be added to the data glob to create a new data glob. In this respect, the EDP 200 may analyze the content inside of a data glob as opposed to just treating a data glob like a black box. This manner of reusing portions of existing data globs to create new data globs, optionally with some additional or different information, may be referred to as "integration." In some embodiments of the present disclosure, the EDP 200 may include an integration tool that may manage existing data globs and utilize existing data globs to create new data globs. The integration tool may be designed to use as much data from existing data globs as possible, for example, to make data storage and access as efficient as possible.

Referring to FIG. 2, the analyzer(s) 204 and/or the manager 206 may build and/or manage data globs. The analyzer 204, the manager 206 or some other component may run statistical analysis on data globs, for example to determine counts of types of data, attributes and the like, or to create lists or other statistics. Data globs may be designed or programmed in an Agile-style data model that allows dynamic analysis of data. Each data glob may go through a data lifecycle, meaning it may go through an iterative, incremental, adaptive and/or evolutionary development process, for example, where contents, relationships and other information about or in the data glob evolve through user interaction, development of related information and the like. Thus, data globs may be flexible and quickly responsive to change.

One or more datastores 210, for example one or more cloud data centers, may accept data from the analyzer(s) 204, for example, in the form of one or more data models. Datastore(s) 210 may be large and scalable, for example, consisting of one or more servers and/or data storage devices. Datastore(s) 210 may be designed and/or adapted, optionally in conjunction with manager 206 and/or other components of the enterprise data processing (EDP) 200, to store data, correlations and/or other information in a manner that the data is "kept alive," meaning the data is readily accessible and manageable. Datastore(s) 210 may be implemented in a big table manner. For example, datastore 210 and/or one or more components of the enterprise data processing (EDP) 200 may utilize a database architecture that is designed for distributed, scalable, big data store (for example, a Hadoop database program such as HBase).

Referring to FIG. 2, manager 206 may communicate with one or more datastores 210 or cloud data centers to manage the data stored therein. Manager 206 may analyze data in the datastore(s) 210 to ensure it is current, live and/or accessible. Manager 206 may analyze data in the datastore(s) 210 to determine new or changed relationships between the data, for example, comparing existing data to newly added data. Manager 206 may run one or more algorithms that are similar to the algorithms explained above with regard to the analyzer 204, for example, a correlation intensity algorithm to determine whether relationships exist and/or the intensity of correlations between data. In some embodiments, one or more algorithms used by the manager 206 to analyze the data in the datastore 210 may be the same algorithms as used by the analyzer 204. Manager 206 may implement one or more version control algorithms and/or routines that analyze data in the datastore(s) 210 to determine whether data is current. Version control algorithms and/or routines may replace old data or may designate new data as the most relevant data while archiving old data.

The user interface/visualizer 208 may provide an interface between users and/or source devices that interface with the EDP 200. The user interface/visualizer 208 may provide visual feedback (for example, via various visualizations (ie. screens or displays) to a user such that the user can see the data and correlation information stored in datastore 210. The user may then interact with the user interface/visualizer to explore, analyze and manipulate data and correlations or relationships between data, as well as other information like statistics. The user interface/visualizer 208 may allow a user to interact with the data and relationships in real time, and receive quick responses. Various configurations of components, communication links, code, routines and the like may exist in the EDP 200 in order to implement analysis and management commands communicated between a user and the datastore 210. One example configuration is shown in FIG. 2 where the user interface/visualizer 208 is in communication with the manager 206, and the manager then communicates with the datastore 210.

The EDP 200 may implement resource access controls and/or role-based access controls. The EDP 200 may utilize one or more routines, algorithms, components or the like to implement resource access controls. As described above, the EDP 200 may collect, analyze and store data from various sources, and this data may be sensitive or private in a variety of ways. For example, an email thread may be sensitive or private to a particular group of users and/or profiles, for example, users that create, send or receive messages in the thread. As another example, content from a social networking service may be sensitive or private to a particular group of users and/or profiles. Each of these users and/or profiles may have associated data such as accounts, passwords and the like. The EDP 200 may create and/or enforce resource access controls with respect to data collected from various sources, for example, to control which users and/or profiles can interact with the particular chunks of data. The EDP 200 may keep track of users and/or profiles that may have certain rights, rules and/or privileges with respect to particular pieces or types of data. The EDP 200 may determine users, profiles and/or "role" information from one or more user databases associated with the enterprise, for example LDAP servers. The EDP may modify, update or create new roles.

The resource access controls used by the EDP 200 may include rights, rules and/or privileges with respect to various commands that a user may attempt to execute, for example, attempts to create, read, write, update or modify data. One benefit of EDP over various types of resource access control schemes may be that the EDP is designed and/or adapted to create and/or enforce access controls and/or role-based access controls with respect to "big data" or large quantities of data stored in a distributed manner in one or more databases, for example, communications databases, cloud data centers and/or other form(s) of databases.

The EDP 200 may implement resource access controls that are based on various "roles" of users who may attempt to create, read, write, update or modify data. Examples of user roles may be supervisors, managers, high-level user accounts and the like. Another example of a user role may be a user that manages only data from a particular type of source, for example, one social networking service or one message board. It should be understood that these are just examples of roles, and many other types of roles may be implemented by the EDP to manage which users may interact with particular types of data. The EDP 200 may determine users, profiles and/or "role" information from one or more user databases associated with the enterprise, for example LDAP servers. The EDP may modify, update or create new roles.

Referring to FIG. 2, the EDP 200 may implement resource access controls and/or role-based access controls in one or more components of the EDP 200 or at one or more stages of the data ingest and/or management process. For example, the analyzer(s) 204 may implement resource access controls when it builds up one or more data models from the data from one or more source devices. For example, the analyzer 204 may assign each "data glob" a set of resource access rules, for example, before each data glob is stored in a data store 210. In this respect, resource access controls may be part of the data stored with each data glob, and resource access controls may be portable like the data globs are. Manager 206 may also implement resource access controls, for example, in a resource access control module 213, as shown in FIG. 2. The resource access control module 213 may perform runtime enforcement of resource access controls and/or role-based access controls, for example, as users attempt to interact with data stored in a datastore 210.

Figure 3:
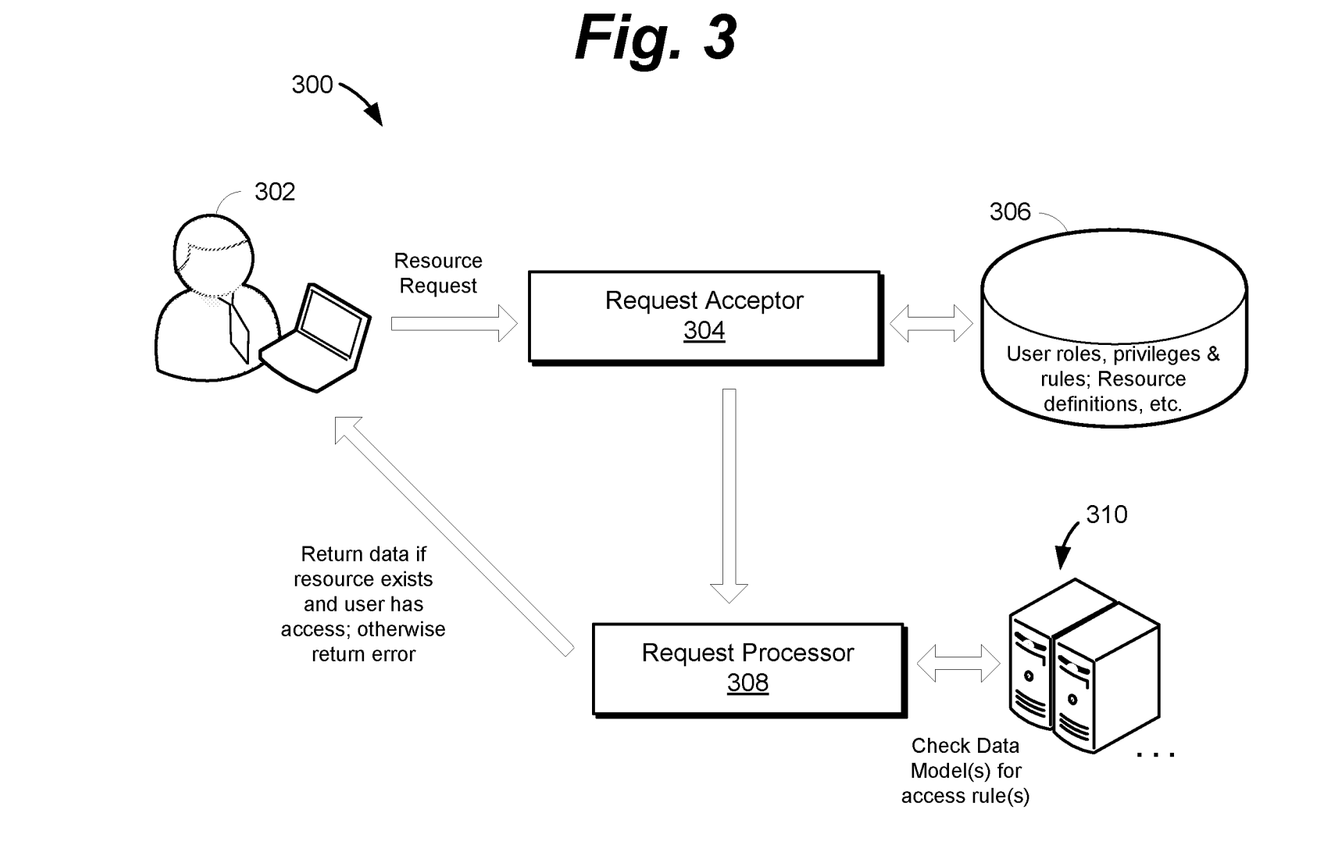
FIG. 3 illustrates relationships between pieces of data according to one or more example embodiments of the present invention.

FIG. 3 depicts an illustration of a block diagram showing example components, connections and interactions of an example resource access control module 300, according to one or more example embodiments of the present disclosure. The resource access control module 300 may be similar to the resource access control module 213, for example, included in manager 206, as shown in FIG. 2. The resource access control module 300 may perform runtime enforcement of resource access controls and/or role-based access controls, for example, as users 302 attempt to interact with data stored in a datastore 310. The resource access control module 300 may accept resource requests from one or more users 302, for example, using a request acceptor module 304. The request acceptor 304 may communicate with one or more enterprise controlled databases 306 that store information about users and their roles, as well as other information such as resource definitions and the like. The resource access control module 300 may process requests, for example, using a request processor module 308. The request processor module 308 may communicate with the datastore 310, for example, to determine the access controls and/or rules associated with the data or data globs that the user 302 is attempting to access. As an example, the request processor module 308 may allow users to read, write and/or modify data in data store 310 depending on the "role" of the user. The request processor module may return data to the user 302 if the data or resource exists and if the access rules allow the user to perform the request that the user is attempting to perform; otherwise, the request processor module 308 may return an error message to the user 302.

Figure 4:
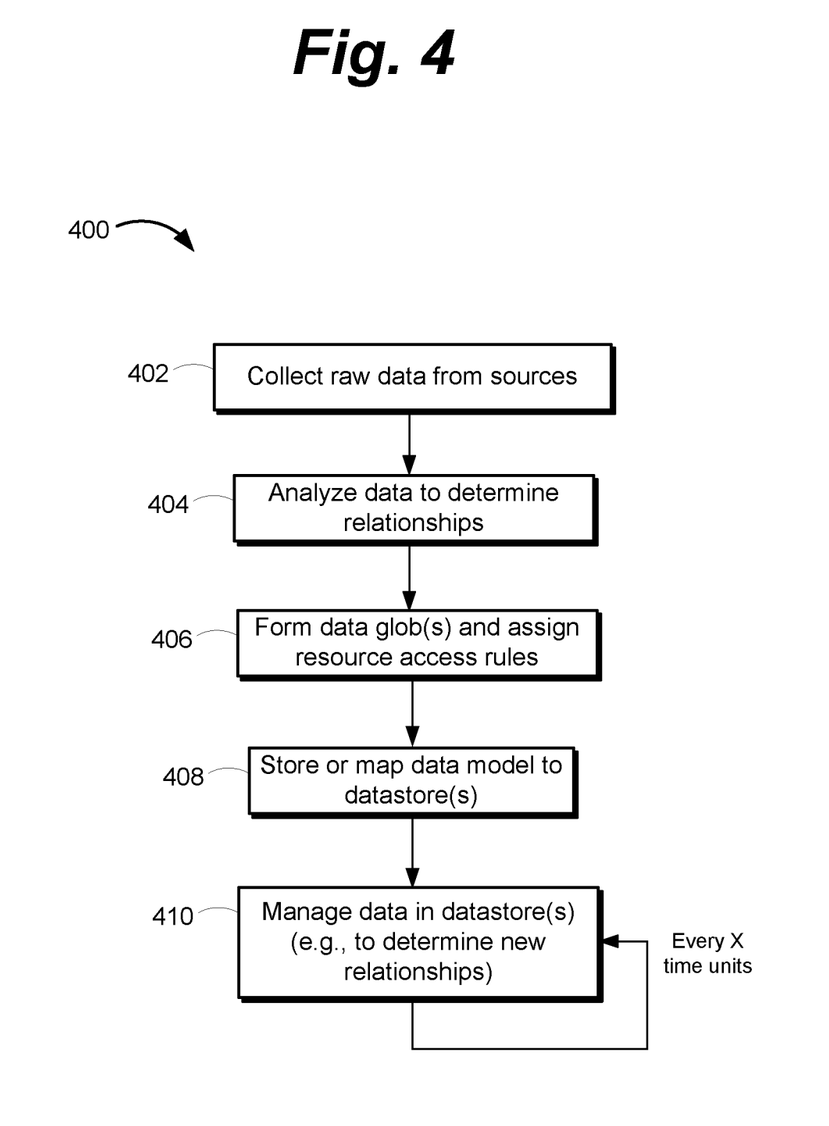
FIG. 4 is a flow chart of operations on raw data in a DRSP according to one or more example embodiments of the present invention.

Certain embodiments of the present disclosure may be found in one or more methods of enterprise data processing. FIG. 4 depicts an illustration of a flow chart 400 showing example steps in a method of enterprise data processing, according to one or more example embodiments of the present disclosure. It should be understood that, in some embodiments, one or more of the steps depicted in FIG. 4 may be performed in a different order than depicted. Additionally, in some embodiments, a method of enterprise data processing may include more or less steps than are depicted in FIG. 4. Specifically, FIG. 4 depicts an example import process for enterprise data processing. At step 402, the enterprise data processing may collect raw data from a variety of sources, for example using one or more collectors as explained above. At step 404, the enterprise data processing may analyze data to determine whether relationships or correlations exist in or between the data, and optionally, the intensity of the relationships. Step 404, may utilize one or more analyzers as explained above. At step 406, the enterprise data processing method may form one or more data globs and may assign each data glob resource access rules. At step 408, the enterprise data processing may store or map one or more data models (including data correlations) to one or more datastores or cloud data centers. At step 410, the enterprise data processing may continually execute one or more routines to manage data in the datastore(s), for example to determine new relationships. Step 410 may use a manager and/or a database management program similar to the ones described above. As one example, step 410 may include executing one or more management routines at regular time intervals.

Figure 5:
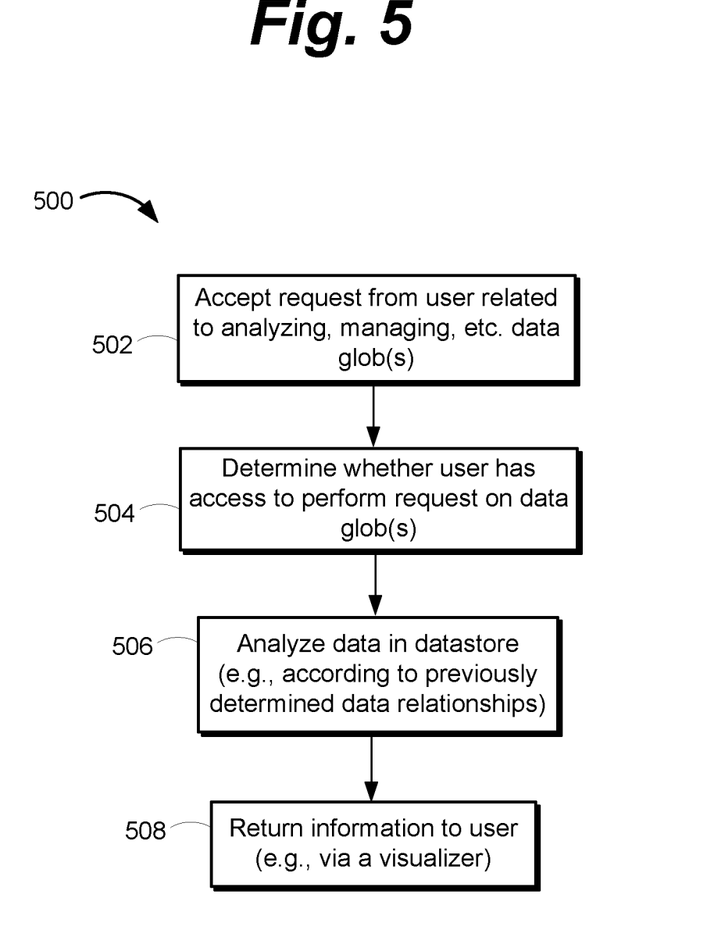
FIG. 5 is a flow chart of operations on previously stored data in a DRSP according to one or more example embodiments of the present invention.

FIG. 5 depicts an illustration of a flow chart 500 showing example steps in a method of enterprise data processing, according to one or more example embodiments of the present disclosure. It should be understood that, in some embodiments, one or more of the steps depicted in FIG. 5 may be performed in a different order than depicted. Additionally, in some embodiments, a method of enterprise data processing may include more or less steps than are depicted in FIG. 5. Specifically, FIG. 5 depicts an example analysis or management process for an enterprise data processing module. At step 502, the enterprise data processing method may accept a request from a user or source device indicating that the user or source device is attempting to analyze, explore, manipulate or manage data or data globs in the datastore. At step 504, the enterprise data processing method may determine whether the user has access to perform the attempted request on the data glob(s). At step 506, enterprise data processing may communicate with the datastore to analyze data in the datastore, for example, according to previously determined data relationships. At step 508, enterprise data processing may return information to the user related to the user request. The enterprise data processing may utilize various visualizations (e.g., screen and/or displays) to communicate with a user.

Components of one or more embodiments may include, for example and not limited to, the following: one or more analyzers, collectors and web services that allow the management and action of these collectors and analyzers. Analyzers may come in many different forms and examples include, but are not limited to, adding modifying and replacing tags, adding modifying and removing records, adding, modifying or removing other analyzers, adding modifying and removing collectors and importing and exporting records in different forms (although the import function may be shared by collectors). Collectors may come in many different forms and examples include, but are not limited to, collecting from HTTP sources such as web sites and RSS feeds, collecting from web service APIs such as Twitter™, Facebook™, Dropbox™, LinkedIn™, Salesforce™ and similar, and collecting from other APIs such as Java Database Connectivity SQL databases, Internet Mail protocol servers (IMAP) and FTP servers. Also collectors may import other file formats such as comma-separated files (CSV), Microsoft Outlook data files (PST) and others.

The Analyzer mechanism may schedule and analyze jobs and use job service to maintain schedules. The Analyzer Service may schedule jobs with the job service; pass trigger information to an analyzer to actually run; turn around and make call backs to invoke an analyzer; and handle mapping between collectors and analyzers. Some analyzers may be triggered to run when a collector finishes, e.g., a PST collector may be configured such that a thread analyzer and profile analyzer will run. A "cross-message" type threader may launch a whole series of analyzers that are run. Jobs may be concurrent, map-reduce jobs or centralized jobs. Analyzers may run asynchronously and can be dynamically loadable and/or role-restricted. A reporter may be used to retrieve data. The reporter may run on demand or may be scheduled using the job service. The reporter may be implemented in a pre-processor for programmatic or user interface access. The reporter may collect and assemble pre-calculated results from analyzer runs. For example, to compare one complex query from last week's data to this week's, each search may take 20 minutes, and then you would still need to merge and compare the results. The reporter may condense known queries for any time granularity, to take a few tenths of seconds.

An Analyzer Service REST may be the Web based API for controlling analyzer services. A Configuration Service is a data storage that holds configuration information for the rest of the components. The Configuration Service may be used to share configuration information such as the list of analyzers or collectors that are available and configured into system. The Configuration Service may also be used to share information on how Hbase system may be setup and what systems may be involved. A Data API may be the underlying Java based API implementation for accessing key-value pairs and doing queries, and managing what's going in and out of the data store. A Data Service may be the actual mapping onto the storage system resources and the management of transfer of data between the users, applications, and machines. A Data Service REST may be the Web based API for data service. An HBase Client may be the entry point for access to the underlying HBase store, which is a point where storage can be swapped from in-memory to cloud-stored file formats. A Job Service may be a set of functions to maintain, schedule and invoke services, like analyzers and collectors.

An Admin Analyzer may backup and restore records to and from ZIP files. A Validation Administrator may check and repair record integrity. A De-Duplication Analyzer may identify records that return similar information and should be hidden from particular view. A Discovery Analyzer may build new collectors from existing record content. An Analyzer Builder Analyzer may build new analyzers from existing record content. An Entity Analyzer may perform Entity Name Recognition and tag records with additional metadata. An Index Analyzer may re-index records following format changes. A Profiles Analyzer may identify references to individuals and build profiles for them. An Email Thread Analyzer may identify email message threads and link to the profiles that created them. A Record Administrator may delete selected records identified by tags. A Sentiment Analyzer may be a 3-value sentiment analyzer which labels individual blobs or messages as negative, neutral or positive or some other quality/attribute. A Stats Analyzer may perform statistical operations on the values of tags or the number and/or types of records. A Table Definition Analyzer may perform bulk tagging operations defined by a database table that is entered and modified by a user. A Tagger Analyzer may add, remove or update tags on records that match a specific query. A Web Link Analyzer may be employed to find links to web pages in record tags and collect these as new records.

A Bing™ Search News Collector may be used to collect news feed data from the Microsoft Bing Service. The Bing™ Search Web Collector may also be used to collect records identified by a web search using the Microsoft Bing Service. A Bridge Collector may allow the import of sets of records filtered by queries from one Bitvore system to another. A CSV Collector may be used to import content from comma-separated value files (CSV). A Twitter™ Collector is a Twitter™ structure-smart component that imports, filters, and incrementally downloads data from a specific Twitter™ account in a compliant manner. A Facebook™ Collector is a Facebook™ structure-smart component that imports, filters, and incrementally downloads data from a specific Facebook™ account in a compliant manner. A Wget Collector may be a generic download manager for grabbing unstructured data and may pull down unstructured content using HTTP, HTTPs, FTP content. An RSS Collector may be the component that goes out, understands and incrementally grabs RSS feed data from a specific Web address. An IMAP Collector may connect to an Internet Mail Protocol server and retrieve records for one or more email accounts. A Web Content Collector may connect to a remote HTTP site and retrieve the contents of this site. The Web Content Collector may also generate multiple records and may perform authentication, authorization and content filtering and transformation if required. An SQL Collector may connect to a standard SQL database, execute queries and save the resulting data to the datastore as records.

There may be additional services and support components ("libraries") to provide common services and capabilities to the analyzers, collectors and web services. These may include a Common Library that may contain general code shared by many projects; an Email Common that may contain code specific to components dealing with email messages; a Search Common that may contain code used to parse, build and execute content searches described by VQL ('Vore Query Language') queries; and a Web Collect Common that may provide code used in components that access web services such as HTTP and HTTPS servers.

The present disclosure may be embedded in a program, which comprises all the features enabling the implementation of the embodiments described herein, and which when loaded in a computer system is able to carry out these embodiments. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, wherein the system comprises:
   one or more collectors configured to collect data related to a particular entity;
   one or more analyzers configured to:
      generate a cross-source relationship, via a plurality of metrics, that indicates a sentiment about one or more dimensions of the particular entity according to the collected data, and
      generate a data glob that is evolved through user interaction; and
   a visualizer configured to communicate the user interaction, wherein:
      the data glob comprises the collected data,
      the data glob comprises access controls and rules associated with the collected data,
      the access controls are stored in the data glob as part of the collected data,
      the access controls are associated with a role that is maintained via enterprise data processing,
      the data glob is transferred to a data center maintained by a third party,
      the data glob is accessible through one or more network connections, and
      the user interaction does not require a user to retrieve the collected data or the cross-source relationship to analyze additional relationships according to the plurality of metrics.

2. The system of claim 1, wherein the one or more data sources comprise one or more of a website server, a social networking application programming interface (API) server, an Internet message access protocol (IMAP) server, and a file transfer protocol (FTP) server.

3. The system of claim 1, wherein the one or more data sources store one or more of an email database, a social media database, a bulletin board database, a content management system, a server log, a phone log, a customer service log, a sales database, an engineering database, a marketing database and a corporate database.

4. The system of claim 1, wherein the one or more collectors are operable to collect the data at regular time intervals.

5. The system of claim 1, wherein the one or more analyzers are operable to analyze a weighted combination of the plurality of metrics over time.

6. The system of claim 1, wherein the one or more analyzers are operable to analyze a sentiment, about the one or more dimensions of a particular entity, over time.

7. The system of claim 1, wherein a weighted combination of the plurality of metrics is produced according to one or more weights assigned from a user interface.

8. The system of claim 1, wherein the particular entity is an enterprise.

9. The system of claim 1, wherein the particular entity is a company.

10. The system of claim 1, wherein the collected data comprises non-textual data.

11. The system of claim 1, wherein each metric in the plurality of metrics is normalized to a range between −1 and 1.

12. The system of claim 1, wherein a sentiment about the one or more dimensions of a particular entity is one of negative, neutral, and positive.

13. The system of claim 1, wherein the one or more dimensions of the particular entity include a strength level.

14. The system of claim 1, wherein the one or more dimensions of the particular entity include a weakness level.

15. The system of claim 1, wherein the one or more dimensions of the particular entity include an opportunity level.

16. The system of claim 1, wherein the one or more dimensions of the particular entity include a threat level.

17. A method for producing one or more indicators of a particular entity, wherein the method comprises:
   collecting, with one or more collectors, data related to a particular entity;
   generating, with one or more analyzers, a cross-source relationship, via a plurality of metrics, that indicates a sentiment about one or more dimensions of the particular entity according to the collected data; and
   generating, with the one or more analyzers, a data glob that is evolved through user interaction with a visualizer, wherein:
      the data glob comprises the collected data,
      the data glob comprises access controls and rules associated with the collected data,
      the access controls are stored in the data glob as part of the collected data,
      the access controls are associated with a role that is maintained via enterprise data processing,
      the data glob is transferred to a data center maintained by a third party,
      the data glob is accessible through one or more network connections, and
      the user interaction does not require a user to retrieve the collected data or the cross-source relationship to analyze additional relationships according to the plurality of metrics.

18. The method of claim 17, wherein the one or more data sources comprise one or more of a website server, a social networking application programming interface (API) server, an Internet message access protocol (IMAP) server, and a file transfer protocol (FTP) server.

19. The method of claim 17, wherein the one or more data sources store one or more of an email database, a social media database, a bulletin board database, a content management system, a server log, a phone log, a customer service log, a sales database, an engineering database, a marketing database and a corporate database.

20. The method of claim 17, wherein the data collecting is at regular time intervals.

21. The method of claim 17, wherein the method comprises analyzing a weighted combination of the plurality of metrics over time.

22. The method of claim 17, wherein the method comprises analyzing a sentiment, about the one or more dimensions of a particular entity, over time.

23. The method of claim 17, wherein the method comprises generating a weighted combination of the plurality of metrics according to one or more weights assigned from a user interface.

24. The method of claim 17, wherein the particular entity is an enterprise.

25. The method of claim 17, wherein the particular entity is a company.

26. The method of claim 17, wherein the collected data comprises non-textual data.

27. The method of claim 17, wherein each metric in the plurality of metrics is normalized to a range between −1 and 1.

28. The method of claim 17, wherein a sentiment about the one or more dimensions of a particular entity is one of negative, neutral, and positive.

29. The method of claim 17, wherein the one or more dimensions of the particular entity include a strength level.

30. The method of claim 17, wherein the one or more dimensions of the particular entity include a weakness level.

31. The method of claim 17, wherein the one or more dimensions of the particular entity include an opportunity level.

32. The method of claim 17, wherein the one or more dimensions of the particular entity include a threat level.

* * * * *